(12) United States Patent
Takeuchi

(10) Patent No.: US 7,168,770 B2
(45) Date of Patent: Jan. 30, 2007

(54) WIND-POWERED BRAKE SYSTEM

(75) Inventor: Kesatoshi Takeuchi, Nagano (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 10/125,572

(22) Filed: Apr. 19, 2002

(65) Prior Publication Data

US 2002/0185911 A1 Dec. 12, 2002

(30) Foreign Application Priority Data

Apr. 20, 2001 (JP) ............................ 2001-123409

(51) Int. Cl.
*B60T 8/64* (2006.01)
*B60L 7/10* (2006.01)

(52) U.S. Cl. ...................... 303/152; 188/2 F; 188/159; 180/165; 180/65.4

(58) Field of Classification Search ............... 303/1, 303/152; 188/2 F, 159; 180/165, 65.4
See application file for complete search history.

(56) References Cited

U.S. PATENT DOCUMENTS

| 2,147,932 | A |   | 2/1939  | Smith              |         |
|-----------|---|---|---------|--------------------|---------|
| 3,556,239 | A | * | 1/1971  | Spahn .............. | 180/65.2 |
| 3,878,913 | A | * | 4/1975  | Lionts et al. ...... | 180/2.2 |
| 4,254,843 | A | * | 3/1981  | Han et al. ......... | 180/165 |
| 4,632,205 | A | * | 12/1986 | Lewis .............. | 180/165 |
| 5,746,283 | A | * | 5/1998  | Brighton ........... | 180/65.3 |
| 5,986,429 | A | * | 11/1999 | Mula, Jr. .......... | 320/101 |

FOREIGN PATENT DOCUMENTS

| DE | 423870      |    | 1/1926  |
|----|-------------|----|---------|
| DE | 433281      |    | 8/1926  |
| EP | 546983 A1   | *  | 6/1993  |
| JP | 04-008654 A |    | 1/1992  |
| JP | 06-060202   |    | 3/1994  |
| JP | 2000-062583 |    | 2/2000  |
| JP | 2000-310180 |    | 11/2000 |
| WO | WO 00/06435 |    | 2/2000  |

* cited by examiner

*Primary Examiner*—Xuan Lan Nguyen
(74) *Attorney, Agent, or Firm*—Roberts Mlotkowski & Hobbes; Thomas W. Cole

(57) ABSTRACT

A wind-powered brake system which is operated to brake a movable body when a driving force of a driving source for moving the movable body should be decreased, is described. The object of the present invention is to assist normal braking, to reduce a heat energy loss, and to perform braking suitable for a necessary braking force.

A wind tunnel 34 is installed in each armrest 16 of a wheelchair 10. In braking, a load for generating power is put on rotary vanes 40 provided in the wind tunnel 34. Thus, the flow of wind is obstructed, and this functions as a braking force. It is thus possible to brake the wheelchair 10 using a combination of a brake mechanism of an electric motor and a wind-powered brake system. The burden on the brake mechanism of the electric motor can be lessened, and early wear and performance degradation due to frictional heat can be suppressed. By assisting the brake function of the electric motor, the amount of heat energy released from the electric motor into the air can be reduced. The generated power can be utilized to charge a battery 32, and the continuous mileage of the wheelchair 10 can be increased.

9 Claims, 4 Drawing Sheets

WIND-POWERED BRAKE SYSTEM

TECHNICAL FIELD OF THE INVENTION

The present invention relates to a wind-powered brake system which is operated to brake a movable body when a driving force of a driving source for moving the movable body should be decreased.

DESCRIPTION OF THE RELATED ART

In vehicles, particularly electric carts (electric wheelchairs and golf carts), wheels are driven by driving an electric motor to cause a vehicle to travel. By controlling the rotating speed of the electric motor, speed control is performed. Although the electric wheelchairs and the golf carts are given as examples of electric carts, electric carts are not limited to low-speed traveling vehicles. It is intended that vehicles using electric motors be given as examples. It is thus assumed that electric cars and solar cars which will replace vehicles having reciprocating engines and diesel engines are within the range of this application.

In a current vehicle driven by an electric motor, when setting a speed, a driver of the vehicle operates a pedal or lever for acceleration, and an acceleration is set in accordance with the degree of operation. When the vehicle travels with the set acceleration and reaches a desired speed, the driver operates the acceleration pedal or the acceleration lever to return to a predetermined level. The speed is maintained by maintaining this operation state at all times.

In contrast, in case of deceleration, the driver returns the acceleration pedal or the acceleration lever to a reference position (speed zero position). When a predetermined deceleration is completed, the operation state of the acceleration pedal or the acceleration lever is maintained to maintain the decelerated speed.

In the vehicle described as above, generally an additional brake pedal is provided as means for braking while the vehicle is moving. By depressing the brake pedal, a brake pad provided for a wheel is pressed against a disc-shaped or drum-shaped surface under a predetermined pressure. A resulting frictional force is used for braking the vehicle.

In electric carts and electric wheelchairs, a brake function of an electric motor is utilized to stop the power supply, thus automatically braking the vehicle.

SUMMARY OF THE INVENTION/PROBLEMS TO BE SOLVED

The brake mechanism in the above vehicle utilizes a frictional force. More specifically, braking occurs by converting the frictional force into heat energy generated by the friction. The heat is a wasted energy which is uselessly released into the air.

In the brake mechanism of the brake pedal, a braking force is adjusted by a driver to suit a current speed. Thus, the braking force does not necessarily become an optimal braking force. Since all the braking forces ranging from a weak one to a strong one depend on the single brake mechanism, the brake mechanism quickly becomes worn. Safe driving cannot be achieved unless the brake pad is periodically replaced.

The external form of the vehicle is designed by fully taking into consideration a aerodynamic characteristic. For example, the exterior is made of a curved surface, thus reducing a Cd value. A down force is generated by installing a spoiler. Although it has been known that wind generated while the vehicle is moving has a great influence on the movement, technology for utilizing the wind power for braking has not been established.

In view of the foregoing facts, it is an object of the present invention to provide a wind-powered brake system for assisting normal braking, for reducing a heat energy loss, and for braking suitably for a necessary braking force.

DETAILED DESCRIPTION OF THE INVENTION

Figure 1:
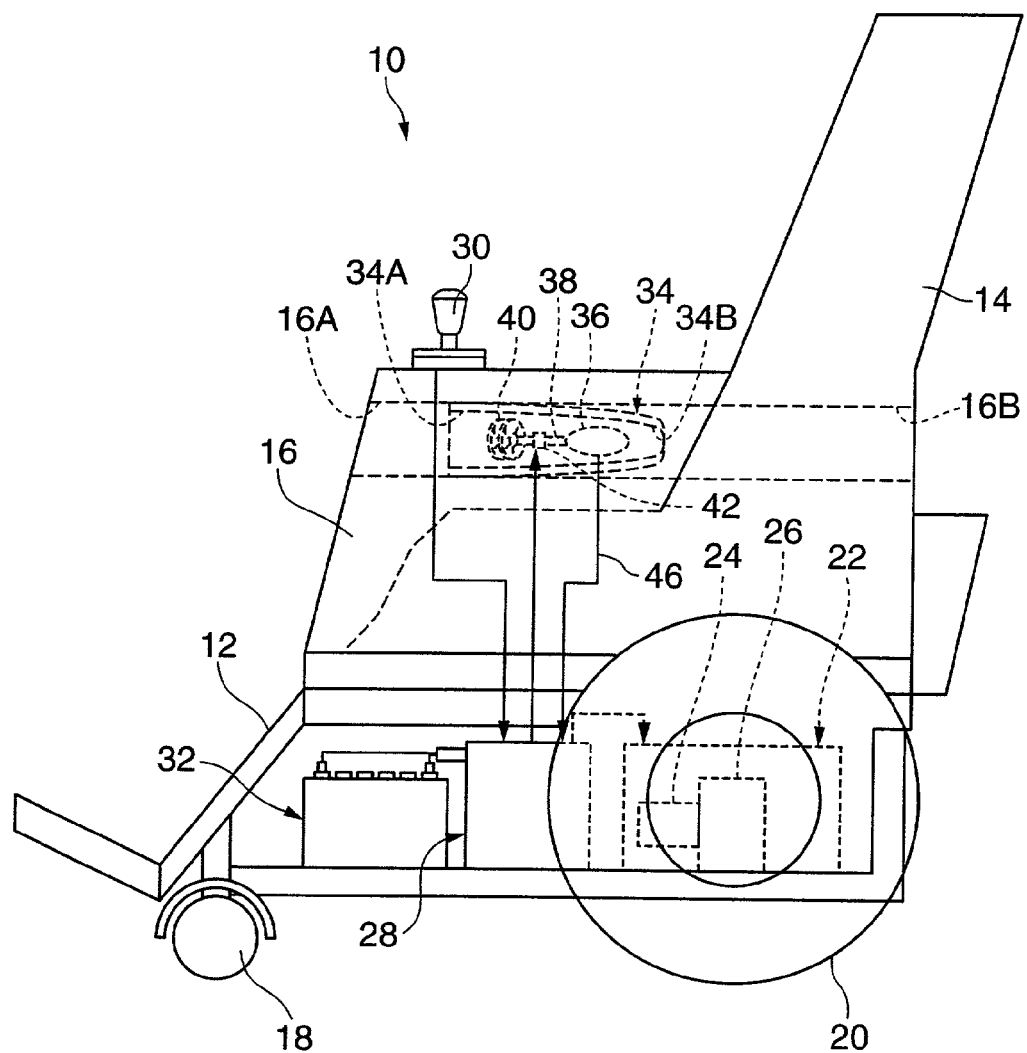
FIG. 1 is a side view of a wheelchair according to an embodiment.

A first invention is a wind-powered brake system which is operated to brake a movable body when a driving force of a driving source for moving the movable body should be decreased. The wind-powered brake system includes a rotary vane which rotates, under no load, based on wind power generated in accordance with the movement of the movable body when the driving force of the driving source is stable at a predetermined value or when the driving force is being increased; and brake control means for applying, when the driving force of the driving source is being decreased, a predetermined load to the rotation of the rotary vane so as to give wind resistance to the movable body, thereby braking the movable body.

According to the first invention, since the brake control means generally puts no load to the rotary vane, even when the movable body is moving, the rotary vane rotates, under no load, based on wind power generated by the movement of the movable body. As a result, the movement of the movable body is not influenced.

When the driving force of the driving source for driving the movable body is being decreased, that is, when the movable body needs to be stopped, the brake control means puts a load to the rotation of the rotary vane. Accordingly, the wind resistance is given to the rotation of the rotary vane, and the flow of wind is obstructed, thereby braking the movable body.

According to the first invention, the brake control means has a wind power generation function for generating power by the rotation of the rotary vane.

In other words, when the load on the rotary vane is a wind power generating function, the generated power can be used as the power for the driving source for the movable body.

A second invention is a wind-powered brake system which is operated to brake a movable body when a driving force of a driving source for moving the movable body should be decreased. The wind-powered brake system includes a rotary vane which rotates in accordance with the movement of the movable body in which a predetermined load is applied to the rotation thereof; a wind tunnel which contains therein the rotary vane and which includes an air inlet for receiving wind while the movable body is moving; and air-inlet opening/closing control means for closing the air inlet of the wind tunnel when the driving force of the driving source is stable at a predetermined value or when the driving force is being increased and for opening the air inlet of the wind tunnel when the driving force of the driving source is being decreased.

According to the second invention, since the air-inlet opening/closing control means normally closes the air inlet of the wind tunnel, no wind enters the wind tunnel, and the rotary vane does not rotate. As a result, the rotary vane has no influence on the movement of the movable body.

In contrast, when the driving force of the driving source for driving the movable body is being decreased, that is, when the movable body needs to be stopped, the air-inlet opening/closing means opens the air inlet of the wind tunnel. Accordingly, wind enters the wind tunnel, and the rotary vane rotates under a predetermined load. The resistance is given by the load to the rotation of the rotary vane, and the flow of wind is obstructed, thereby braking the movable body.

According to the second invention, the wind-powered brake system further includes wind power generating means for generating power by the rotation of the rotary vane.

In other words, by providing the wind-power generating means for generating power by the rotation of the rotary vane, the power generated by the rotation of the rotary vane can be used as the power for the driving source for the movable body.

According to the first invention or the second invention, the wind-powered brake system further includes a main brake system which is provided on the movable body and which generates a braking force by a frictional force; and an operation part which has a predetermined degree of operation and which increases/decreases the braking force by the main brake system in accordance with the degree of operation.

According to the first invention or the second invention, in accordance with the degree of operation input by the operation part, the wind-powered brake system and the main brake system switch to one another, or the wind-powered brake system is used together with the main brake system.

For example, as the operation part, a brake pedal provided in a general vehicle can be adopted. In accordance with the degree of depression of the brake pedal, braking is switched among braking only by the wind-powered brake system, braking only by the main brake system, and braking by a combination of the wind-powered brake system and the main brake system. Accordingly, the function of the wind-powered brake system can be fully utilized. In this case, braking can be switched in accordance with the speed.

In FIG. 1, an electric wheelchair 10 as a vehicle according to an embodiment is shown.

In the electric wheelchair 10, a seat 14 for a user to sit in is provided on a base 12 built of a plurality of pipes. The seat 14 is provided with armrests 16.

In plan view, the base 12 is substantially rectangular. At two front corners of four corners, a pair of castors 18 is provided (only one castor is shown in FIG. 1).

At the rear of the base 12, a pair of tires 20 is provided (only one tire is shown in FIG. 1). In connection with the castors 18, the tires 20 support the wheelchair 10 relative to a road surface.

An axle of each tire 20 is coupled through a speed-change gear unit 26 to an electric motor 24 provided in a driver 22. Each tire 20 is rotated by a driving force of the electric motor 24. A driving controller 28 is connected to the driver 22. The driving controller 28 controls the driving state of the electric motor 24 in the driver 22 and gear engagement by the speed-change gear unit 26. Accordingly, the wheelchair 10 can move.

The movement of the wheelchair 10 is operated by a lever 30 provided in the armrest 16 of the seat 14. By pushing the lever 30 forward, the wheelchair 10 moves. By returning the lever 30 (neutral), the wheelchair 10 stops.

The driving controller 28 can drive the left and the right tires 20 at different speeds by changing the gear engagement of the speed-change gear unit 26 in the driver 22. In other words, the speed differential can change a direction in which the wheelchair 10 moves. With this operation, the left and the right tires 20 can be independently driven. More specifically, by pushing the lever 30 to the right, the speed of the right tire 20 decreases by a predetermined value, and the wheelchair 10 gradually turns to the right. When the lever 30 is pushed to the left, the speed of the left tire 20 decreases by a predetermined value, and the wheelchair 10 gradually turns to the left. When the lever 30 is pushed backward, the left and the right tires 20 rotate in the opposite directions at a predetermined rotating speed, and the wheelchair 10 can turn around in situ.

In the vicinity of the driving controller 28, a battery unit 32 is provided. The driver 22 is driven by power from the battery 32 through the driving controller 28. It is necessary to charge the battery 32 before moving the wheelchair 10.

In the armrests 16 provided at the left and the right of the seat 14, wind tunnels 34 as wind-power brake system of the present invention are installed. Each wind tunnel 34 is a so-called cigar-shaped type or a bullet-shaped type. At the tip of the wind tunnel 34, an air inlet 34A is provided. The air inlet 34A is coupled to a front aperture 16A of the armrest 16. An air outlet 34B is provided at the rear of the wind tunnel 34, and the air outlet 34B is coupled to a rear aperture 16B of the armrest 16.

Figure 2:
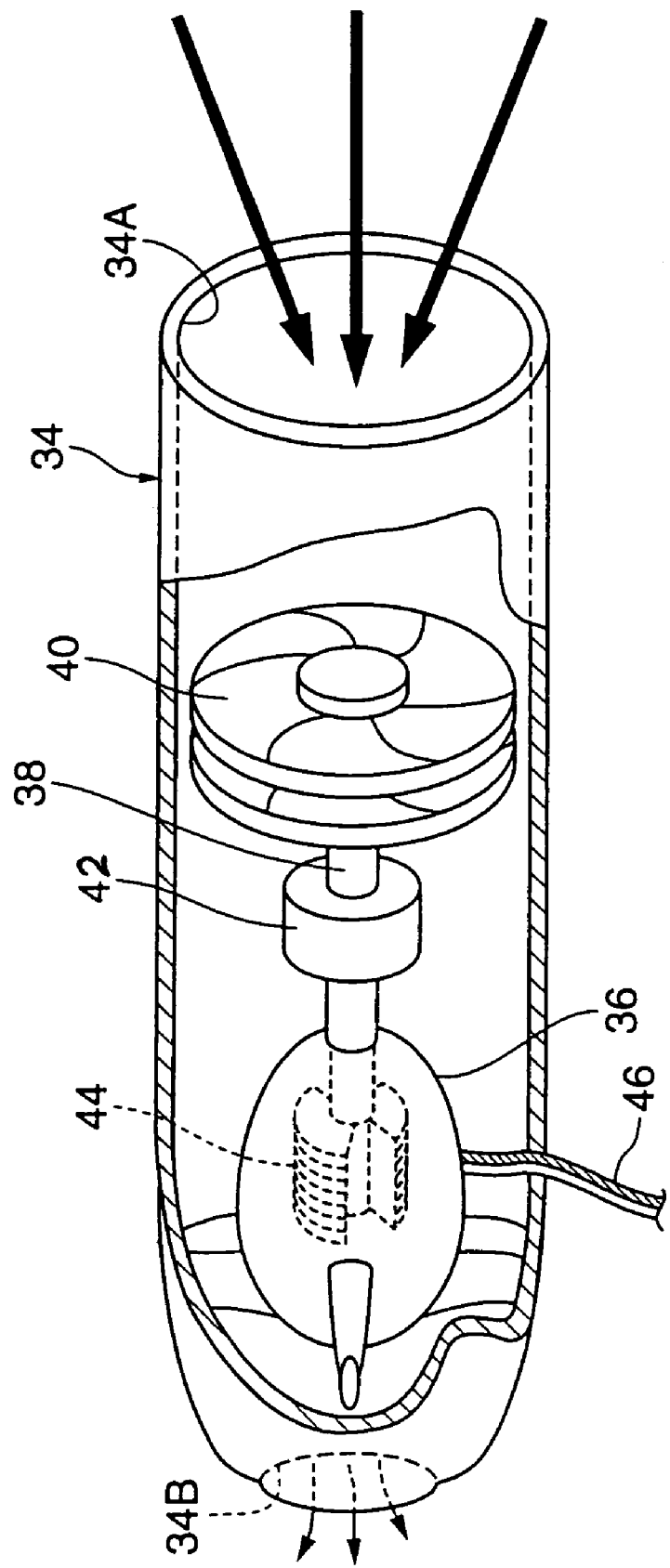
FIG. 2 is a perspective view of the internal structure of a wind tunnel.

As shown in FIG. 2, the interior of the wind tunnel 34 includes a supported body 36 supported by the inner surface of the wind tunnel 34. A rotating shaft 38 protrudes from the supported body 36. The axis of the rotating shaft 38 coincides with the axis of the wind tunnel 34. A plurality of rotary vanes 40 is provided at the protruding tip of the rotating shaft 38. On the rotating shaft 38, clutch means 42 which is electrically connectable/disconnectable is provided between the rotary vanes 40 and the supported body 36.

The supported body 36 contains therein a power-generating coil 44 which is coupled to the rotating shaft 38. When the rotating shaft 38 and the power-generating coil 44 are engaged by the clutch means 42, the rotation of the rotary vanes 40 causes the power-generating coil 44 to rotate through the rotating shaft 38. The rotation of the power-generating coil 44 generates power, and the power is fed to the driving controller 28 (see FIG. 1) through wiring 46. A load required for power generation is put on the rotation of the rotary vanes 40 for generating power.

In contrast, when the rotating shaft 38 and the power-generating coil 44 are disengaged by the clutch means 42, no load is put on the rotation of the rotary vanes 40. Thus, the rotary vanes 40 freely rotate.

The clutch means 42 is operated in connection with the operation of the lever 30. When the lever 30 is at a neutral position so that the vehicle 10 stops, the clutch means 42 engages the rotating shaft 38 and the power-generating coil 44. In a normal moving state (moving at a constant speed or moving with an acceleration), the clutch means 42 disengages the rotating shaft 38 and the power-generating coil 44.

When the wheelchair 10 is moving at a constant speed, wind gets into the air inlet 34A of the wind tunnel 34, and the rotary vanes 40 are rotated by the wind power. In this case, since no load is put on the rotation of the rotary vanes 40, the rotary vanes 40 freely rotate in accordance with the wind power. When the wheelchair 10 is decelerating, wind which is introduced into the air inlet 34A of the wind tunnel 34 causes the rotary vanes 40 to rotate. In this case, the resistance is given to the rotary vanes 40 in order to generate power. Thus, the flow of wind is obstructed, and the wind assists in braking.

Figure 3:
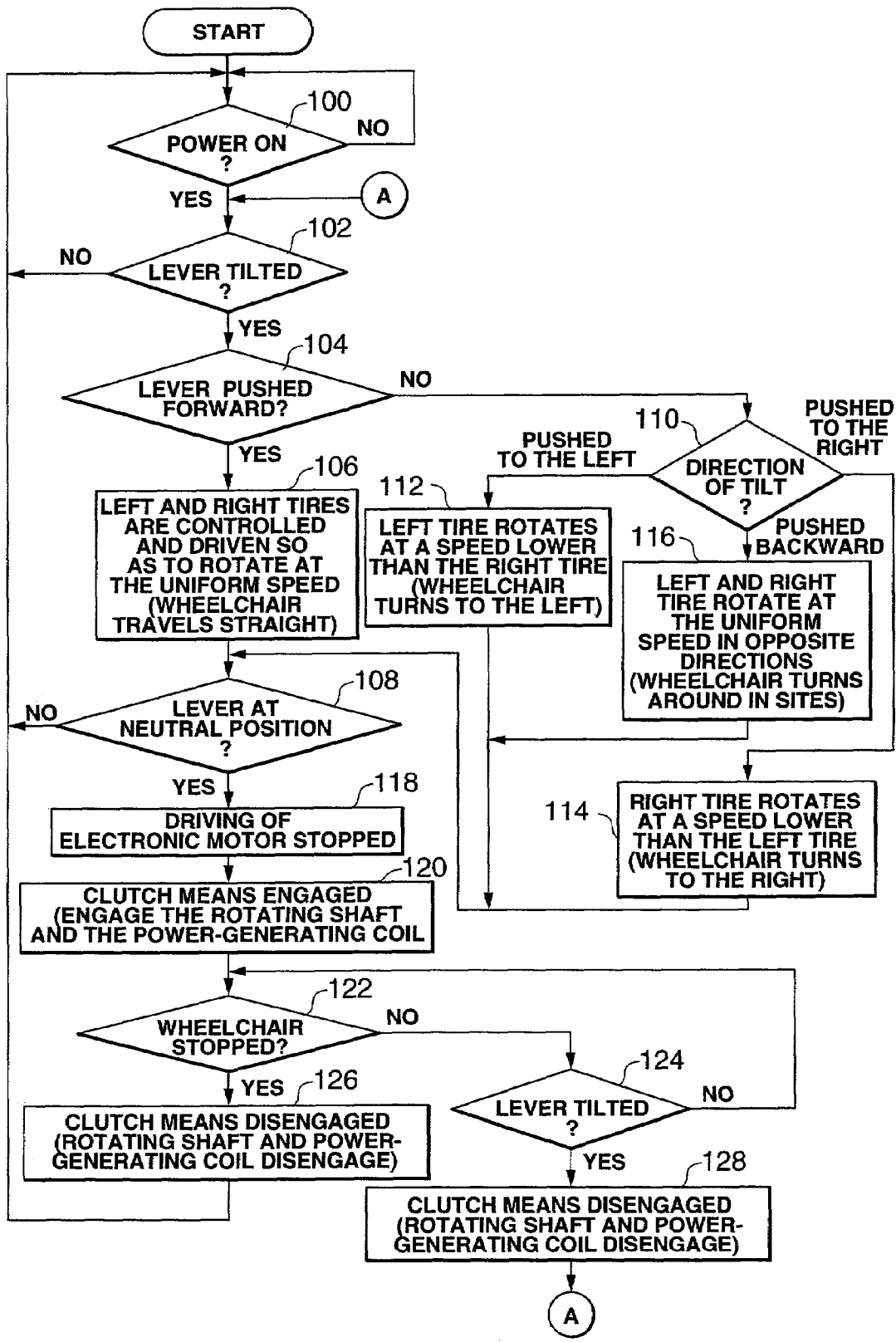
FIG. 3 is a flowchart showing a driving and braking control flow according to the present embodiment.

The operation of this embodiment will now be described with reference to a flowchart shown in FIG. 3.

In step 100, it is determined whether or not the power is ON. If the determination is affirmative, it is determined in step 102 whether or not the lever 30 is tilted.

If it is determined in step 102 that the lever 30 is tilted, it is determined in step 104 whether the lever 30 is pushed forward, that is, whether the wheelchair 10 is traveling straight.

If the determination in step 104 is affirmative, in step 106, the left and right tires 20 are controlled and driven so as to rotate at the uniform speed, and the operation proceeds to step 108. Accordingly, the wheelchair 10 travels straight.

In contrast, if the determination in step 104 is negative, the direction of tilt is determined in step 110. If it is determined in step 110 that the lever 30 is pushed to the left, in step 112, the gears are engaged and the left and right tires 20 are driven so that the left tire 20 rotates at a speed lower than that of the right tire 20, and the operation proceeds to step 108. As a result, the wheelchair 10 turns to the left.

If it is determined in step 110 that the lever 30 is pushed to the right, in step 114, the gears are engaged and the left and right tires 20 are driven so that the right tire 20 rotates at a speed lower than that of the left tire 20, and the operation proceeds to step 108. As a result, the wheelchair 10 turns to the right.

If it is determined in step 110 that the lever 30 is pushed backward, in step 116, the gears are engaged and the left and right tires 20 are driven so that the left and right tires 20 rotate at the uniform speed in the opposite directions, and the operation proceeds to step 108. As a result, the wheelchair 10 turns around in situ. Whether the wheelchair 10 makes a rightward U-turn or a leftward U-turn can be determined in advance or can be determined in accordance with the operation of the lever 30. For example, when the lever 30 is pushed to the right and then is pushed backward, the wheelchair 10 makes a rightward U-turn. In contrast, when the lever 30 is pushed to the left and then is pushed backward, the wheelchair 10 makes a leftward U-turn.

In step 108, it is determined whether or not the lever 30 is returned to a neutral position. If it is determined that the lever 30 is not returned to the neutral position (negative determination), the operation returns to step 100, and the current state is maintained.

If the determination in step 108 is affirmative, in step 118, the driving of the driver 22 is stopped. In other words, the driving of the electric motor 24 is stopped. Generally the electric motor 24 has a brake mechanism. By stopping the power supply to the electric motor 24, the brake is applied to the wheelchair 10.

Since braking is from a frictional force, when the brake is frequently and repetitively applied, the brake function may deteriorate due to wear. The life of the electric motor 24 may be shortened by frictional heat caused by braking. Since heat energy caused by braking is emitted into the air, the energy is wasted.

In this embodiment, the above braking is combined with wind-powered braking. Specifically, after the driving of the electric motor 24 is stopped in step 118, in step 120, the clutch means 42 engages the rotating shaft 38 and the power-generating coil 44 in the wind tunnel 34. In other words, the rotating shaft 38 is disengaged from the power-generating coil 44 when the wheelchair 10 travels normally. Even when the wind blowing against the wheelchair 10 enters the wind tunnel 34 from the air inlet 34A and causes the rotary vanes 40 to rotate, traveling is not influenced since no load is put on the rotary vanes 40.

In contrast, when the rotating shaft 38 is engaged with the power-generating coil 44 in step 120, a load for generating power (load generated by the rotation of the power-generating coil 44) is put on the rotary vanes 40. As a result, it becomes difficult for the wind in the wind tunnel 34 to flow. This functions as the resistance, and braking is further promoted.

By combining wind-powered braking with braking by the electric motor 24, the burden on braking by the electric motor 24 is lessened. By lessening the burden on braking, the amount of heat energy released can be reduced.

In step 122, it is determined whether or not the wheelchair 10 stopped. If the wheelchair 10 did not stop, it is determined in step 124 whether the lever 30 is again tilted until the wheelchair 10 completely stops. If the determination in step 124 is negative, the operation returns to step 122. Steps 122 and 124 are repeated until the wheelchair 10 stops or the lever 30 is again operated.

If it is determined in step 122 that the wheelchair 10 stopped (affirmative determination), in step 126, the engagement of the rotating shaft 38 and the power-generating coil 44 by the clutch means 42 is disengaged, and the operation proceeds to step 100. The wheelchair 10 remains at a stop and waits for a subsequent operation.

If it is determined in step 124 that the lever 30 is tilted (affirmative determination), in step 128, the engagement of the rotating shaft 38 and the power-generating coil 44 by the clutch means 42 is disengaged, and the operation proceeds to step 104. The operation in accordance with the direction of tilt of the lever 30 starts.

As described above, in this embodiment, the wind tunnel 34 is installed in the armrest 16 of the wheelchair 10. In braking, a load for generating power is put on the rotary vanes 40 in the wind tunnel 34. The flow of wind is obstructed, and this functions as a braking force. Thus, the brake mechanism of the electric motor 24 and wind-powered braking can be used at the same time for braking the wheelchair 10. Accordingly, the burden on the brake mechanism of the electric motor 24 is lessened, and early wear and performance degradation due to frictional heat are suppressed. By assisting the brake function of the electric motor 24, the amount of heat energy released from the electric motor 24 into the air can be reduced.

The generated power can be utilized by feeding back the power to a charging system such as the battery 32. Accordingly, the continuous mileage of the wheelchair 10 can be increased.

Although the wind-powered brake system is applied to the wheelchair 10 in this embodiment, the wind-powered brake system can be applied to other electric carts and general vehicles. The wind-powered brake system is applicable to any type of movable body as long as the movable body is subjected to winds while being driven.

Figure 4:
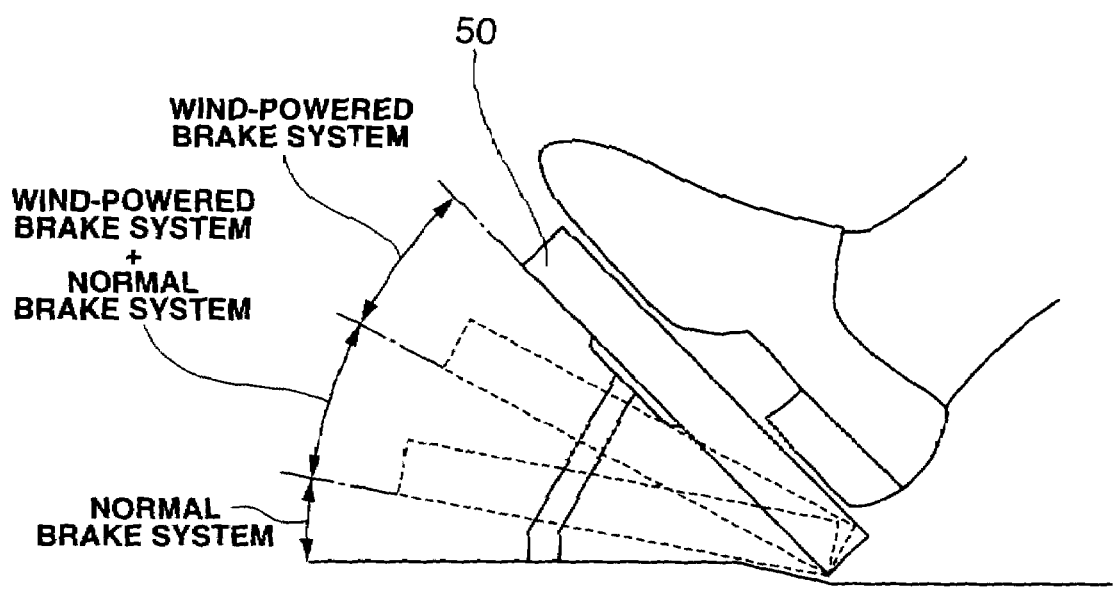
FIG. 4 is a side view illustrating the selective use of braking in accordance with the degree of depression of a foot brake.

As shown in FIG. 4, the wind-powered brake system is applicable to a structure in which a brake pedal 50 is provided, as in general vehicles, and an additional brake mechanism is provided. In this case, the wind-powered brake system can be operatively associated with the brake pedal 50. In accordance with the degree of depression of the brake pedal 50, the wind-powered brake system and the normal brake system can be selectively used. For example, as shown in FIG. 4, when the degree of depression is divided into three, braking can be selected from among braking by the wind-powered brake system, braking by a combination of the wind-powered brake system and the normal brake system, and braking by the normal brake system. The selection of braking is not limited to these three types.

As described above, according to the present invention, it is possible to assist normal braking, to reduce a heat energy loss, and to perform braking suitable for a necessary braking force.

REFERENCE NUMERALS

10: wheelchair (movable body)
12: base
14: seat
16: armrests
18: castors
20: tires
22: driver
24: electric motor
26: speed-change gear unit
28: driving controller
30: lever
32: battery
34: wind tunnel
36: supported body
38: rotating shaft
40: rotary vanes
42: clutch means
44: power-generating coil
46: wiring
50: brake pedal

What is claimed is:

1. A wind-powered brake system which is operated to brake a movable body when a driving force of an electric motor for moving the movable body should be decreased, wherein said electric motor is electrically connected to a source of power comprising:
a rotary vane which rotates based on wind power, said rotation of said rotary vane being subjected to no load only when the driving force of the electric motor is stable at a predetermined value or when the driving force is being increased; and
a brake control circuit for controlling a braking force applied to said movable body by subjecting said rotary vane to a predetermined resistance load, wherein said predetermined resistance load is applied to the rotation of the rotary vane only after the electric motor is electrically disconnected from said source of power such that the rotary vane gives wind resistance to the movable body, thereby braking the movable body.

2. The wind-powered brake system according to claim 1, wherein the brake control circuit has a wind power generation function for generating power by the rotation of the rotary vane.

3. The wind-powered brake system according to any one of claims 1 to 2, further comprising:
a main brake system which is provided on the movable body and which generates a braking force by a frictional force; and
an operation part which has a predetermined degree of operation and which increases or decreases the braking force by the main brake system in accordance with the degree of operation.

4. The wind-powered brake system according to claim 3, wherein the wind-powered brake system and the main brake system switch to one another in accordance with the degree of operation input by the operation part.

5. The wind-powered brake system according to claim 3, wherein the wind-powered brake system is used together with the main brake system in accordance with the degree of operation input by the operation part.

6. The wind-powered brake system according to claim 2, wherein the brake control circuit includes an electrical generator separate from said electric motor for generating electrical power from said predetermined resistance load.

7. The wind-powered brake system according to claim 2, further comprising a power generating coil connected to said rotary vane through a clutch, wherein said clutch mechanically engages said rotary vane to said power generating coil when said electric motor is electrically disconnected from said source of power.

8. The wind-powered brake system according to claim 1 wherein said movable body is a wheelchair.

9. A wind-powered brake system which is operated to brake a wheelchair when a driving force of a driving source for moving the wheelchair should be decreased, wherein said driving source is electrically connected to a source of power comprising:
a rotary vane mounted on said wheelchair which rotates based on wind power, said rotation of said rotary vane being subjected to no load only when the driving force of the driving source is stable at a predetermined value or when the driving force is being increased; and
a brake control circuit mounted on said wheelchair for controlling a braking force applied to said wheelchair by subjecting said rotary vane to a predetermined resistance load, wherein said predetermined resistance load is applied to the rotation of the rotary vane only after the driving source is electrically disconnected from said source of power such that the rotary vane gives wind resistance to the wheelchair, thereby braking the wheelchair.

* * * * *